US012533927B2

(12) United States Patent
Guo et al.

(10) Patent No.: US 12,533,927 B2
(45) Date of Patent: Jan. 27, 2026

(54) THERMAL MANAGEMENT SYSTEM FOR ELECTRIC FORKLIFT

(71) Applicant: Eneroc New Energy Technology Co., Ltd., Hangzhou (CN)

(72) Inventors: Yadong Guo, Hangzhou (CN); Hao Hu, Hangzhou (CN); Qi Xu, Hangzhou (CN)

(73) Assignee: Eneroc New Energy Technology Co., Ltd., Hangzhou (CN)

( * ) Notice: Subject to any disclaimer, the term of this patent is extended or adjusted under 35 U.S.C. 154(b) by 153 days.

(21) Appl. No.: 18/597,504

(22) Filed: Mar. 6, 2024

(65) Prior Publication Data
US 2025/0042218 A1 Feb. 6, 2025

(30) Foreign Application Priority Data
Aug. 1, 2023 (CN) .......................... 202310961020.4

(51) Int. Cl.
*B60H 3/00* (2006.01)
*B60H 1/00* (2006.01)
(52) U.S. Cl.
CPC ..... *B60H 1/00278* (2013.01); *B60H 1/00885* (2013.01); *B60H 1/00921* (2013.01); *B60H 2001/00928* (2013.01)
(58) Field of Classification Search
CPC ............ B60H 1/00278; B60H 1/00885; B60H 1/00921; B60H 2001/00928

USPC ............................................. 165/42
See application file for complete search history.

(56) References Cited

FOREIGN PATENT DOCUMENTS

| CN | 115489267 A | * | 12/2022 | .......... H01M 10/625 |
| WO | WO2012040022 A2 | * | 3/2012 | .............. B60L 58/26 |
| WO | WO2019062946 A1 | * | 4/2019 | .......... H01M 10/615 |

* cited by examiner

*Primary Examiner* — Davis D Hwu
(74) *Attorney, Agent, or Firm* — Kirk A. Wilson; Joseph T. Guy; Patent Filing Specialist Inc (57) ABSTRACT

A thermal management system for an electric forklift. The system includes a battery cooling circulation loop, a battery heating circulation loop, a cab cooling circulation loop, a cab heating circulation loop, a turn-on control unit, and a thermal management control module. The battery cooling circulation loop includes a battery cooling sub-loop and a refrigerant sub-loop. The battery cooling circulation loop and the refrigerant sub-loop are connected in parallel, and share an electric compressor and a condenser. The cab heating circulation loop and the battery heating circulation loop are connected in parallel, and share a heater and a second power unit. The turn-on control unit separately controls turn-on and turn-off of the loops. The thermal management control module controls the operation of the turn-on control unit and the loops according to battery temperature data in the electric forklift and/or a thermal management request inputted from the outside.

9 Claims, 1 Drawing Sheet

THERMAL MANAGEMENT SYSTEM FOR ELECTRIC FORKLIFT

CROSS REFERENCE TO RELATED APPLICATION

This patent application claims the benefit and priority of Chinese Patent Application No. 202310961020.4, filed with the China National Intellectual Property Administration on Aug. 1, 2023, the disclosure of which is incorporated by reference herein in its entirety as part of the present application.

TECHNICAL FIELD

The present disclosure relates to the technical field of temperature control, and in particular, to a thermal management system for an electric forklift.

BACKGROUND

Electric forklifts mainly employ lithium batteries. The suitable battery temperature is 15° C. to 45° C. In high-temperature environments or when the batteries are operating at high rates, excessive temperature can easily cause battery life decline and safety issues. In low-temperature environments, when the battery temperature is too low, capacity fade occurs, the batteries cannot be charged, the charge-discharge rate is extremely low, and the like, which will seriously affect the operating efficiency of the forklifts. In other words, thermal management is required for the batteries of the electric forklifts.

In addition, some electric forklifts employ cab air conditioning systems to adjust the temperature of cabs. However, there is currently no thermal management system in the field of electric forklifts, which can meet the thermal management requirements of the cabs and batteries at the same time.

SUMMARY

An objective of the present disclosure is to provide a thermal management system for an electric forklift, which can regulate and control the temperature in a cab while cooling or heating a battery of the electric forklift, thereby meeting thermal management requirements of the cab and the battery.

To achieve the above objective, the present disclosure provides the following solutions:

A thermal management system for an electric forklift, where the thermal management system includes:
- a battery cooling circulation loop, including a battery cooling sub-loop and a refrigerant sub-loop, where the battery cooling sub-loop includes a battery temperature regulator and a first power unit connected through a pipeline, and a cooling liquid cavity of a heat exchanger; and the refrigerant sub-loop includes an electric compressor, a condenser and a first expansion valve connected through a pipeline, and a refrigerant cavity of the heat exchanger;
- a battery heating circulation loop including a heater, a second power unit and the battery temperature regulator connected through a pipeline;
- a cab cooling circulation loop, including a refrigeration evaporator and a second expansion valve connected through a pipeline, and the electric compressor and a condenser, where the refrigeration evaporator is disposed in a cab of an electric forklift;
- a cab heating circulation loop including a warm air heat exchanger, the heater and the second power unit connected through a pipeline, where the warm air heat exchanger is disposed in the cab;
- a turn-on control unit configured to separately control turn-on and turn-off of the battery cooling sub-loop, the refrigerant sub-loop, the battery heating circulation loop, the cab cooling circulation loop and the cab heating circulation loop; and
- a thermal management control module connected to a battery management controller in the electric forklift, and configured to:
- control at least one of the electric compressor, the heater, the first power unit, the second power unit and the turn-on control unit to operate according to parameter information, where the parameter information includes a thermal management request and at least one of battery temperature data transmitted by the battery management controller; the thermal management request is configured to regulate a cab temperature and/or a battery temperature;
- the first power unit is configured to provide power to a fluid working medium in the battery cooling sub-loop; and the second power unit is configured to provide power to a fluid working medium in the battery heating circulation loop and/or the cab heating circulation loop.

Optionally, the thermal management system further includes:
- a temperature measurement unit configured to measure and obtain fluid temperature data, and/or measure a temperature in the cab of the electric forklift to obtain indoor temperature data, where the fluid temperature data includes at least one of temperatures of the fluid working medium flowing through an inlet end, an interior and an outlet end of the battery temperature regulator; and
- the parameter information further includes the fluid temperature data and/or the indoor temperature data.

Optionally, on the aspect of controlling at least one of the electric compressor, the heater, the first power unit, the second power unit and the turn-on control unit to operate according to the parameter information, the thermal management control module is specifically configured to:
- when the thermal management request includes a battery cooling request, and/or when the battery temperature data is higher than a first threshold:
- control the turn-on control unit, such that the battery cooling sub-loop and the refrigerant sub-loop are both turned on, and the battery heating circulation loop is turned off;
- enable the electric compressor to operate, such that a refrigerant flows through the refrigerant cavity to cool the fluid working medium in the cooling liquid cavity; and
- control the first power unit to operate, such that the fluid working medium in the battery cooling sub-loop circularly flows;
- when the thermal management request includes a battery heating request, and/or when the battery temperature data is lower than a second threshold:
- control the turn-on control unit, such that the battery heating circulation loop is turned on, and the battery cooling sub-loop is turned off;
- enable the heater to heat the fluid working medium in the battery heating circulation loop; and control the second power unit to operate, such that the fluid working medium in the battery heating circulation loop circularly flows;

when the thermal management request includes a cab cooling request:

control the turn-on control unit, such that the cab cooling circulation loop is turned on; and enable the electric compressor to operate, such that the refrigerant flows through the refrigeration evaporator; and when the thermal management request includes a cab heating request:

control the turn-on control unit, such that the cab heating circulation loop is turned on;

control the second power unit to operate, such that the fluid working medium in the cab heating circulation loop circularly flows; and enable the heater to heat the fluid working medium in the cab heating circulation loop.

Optionally, the fluid temperature data includes the fluid temperatures at the inlet end and the outlet end of the battery temperature regulator;

when the parameter information includes the fluid temperature data, on the aspect of controlling at least one of the electric compressor, the heater, the first power unit, the second power unit and the turn-on control unit to operate according to the parameter information, the thermal management control module is configured to:

when the thermal management request includes a battery cooling request, and/or when the battery temperature data is higher than a first threshold:

if the fluid temperature at the inlet end is less than or equal to a first target value, turn on the battery cooling sub-loop, turn off the battery heating circulation loop, enable the first power unit to operate at a second power rotation speed, and enter a second cooling control phase; and if the fluid temperature at the inlet end is greater than the first target value, enter a first cooling control phase;

in the first cooling control phase:

control the turn-on control unit, such that the battery cooling sub-loop and the refrigerant sub-loop are both turned on, and the battery heating circulation loop is turned off;

determine whether a difference between the fluid temperature at the outlet end and the first target value is greater than or equal to a first preset value;

if yes, determine that the first power unit and the electric compressor respectively operate at a first power rotation speed and a first compression rotation speed; and if not, determine that the first power unit operates at the second power rotation speed, and the electric compressor operates at a second compression rotation speed;

after the fluid temperature at the inlet end is less than or equal to the first target value, stop the operation of the electric compressor in the refrigerant sub-loop, and enter the second cooling control phase:

in the second cooling control phase:

each time when the fluid temperature at the inlet end is greater than the first target value and a difference therebetween is greater than or equal to a second preset value, perform an electric compressor control operation;

the electric compressor control operation including:

start the operation of the electric compressor in the refrigerant sub-loop, and determine that the electric compressor operates at the second compression rotation speed;

after the fluid temperature at the inlet end is less than or equal to the first target value, stop the operation of the electric compressor in the refrigerant sub-loop;

the first power rotation speed being greater than the second power rotation speed; the first compression rotation speed being greater than the second compression rotation speed; the first preset value being greater than the second preset value;

when the thermal management request includes a battery heating request, and/or when the battery temperature data is lower than a second threshold, enter a first heating control phase, such that the fluid temperature at the inlet end is greater than or equal to the second target value;

after the fluid temperature at the inlet end is greater than or equal to the second target value, stop the operation of the heater in the battery heating circulation loop, and enter a second heating control phase;

in the first heating control phase:

if the fluid temperature at the inlet end is less than the second target value, perform a battery heating operation;

control the turn-on control unit, such that the battery heating circulation loop is turned on, and the battery cooling sub-loop is turned off;

determine whether a difference between the fluid temperature at the outlet end and the second target value is greater than a third preset value;

if yes, enable the second power unit to operate at a third power rotation speed, and enable the heater to operate at first heating power;

if not, enable the second power unit to operate at a fourth power rotation speed, and enable the heater to operate at second heating power; and in the second heating control phase: each time when the fluid temperature at the inlet end is greater than the second target value and a difference therebetween is greater than or equal to a fourth preset value, perform a heater control operation;

the heater control operation including:

restore the operation of the heater in the battery heating circulation loop, and enable the heater to operate at the second heating power; and after the fluid temperature at the inlet end is greater than or equal to the second target value, stop the operation of the heater in the battery heating circulation loop;

the first heating power being greater than the second heating power; the third power rotation speed being greater than the fourth power rotation speed; the third preset value being greater than the fourth preset value; and the first threshold being greater than the second threshold.

Optionally, the thermal management system further includes:

a pressure measurement unit configured to separately measure pressures of an inlet end pipeline and an outlet end pipeline of the electric compressor to obtain an inlet pressure value and an outlet pressure value; and a condensation fan configured to blow air to the condenser, where the parameter information further includes the inlet pressure value and the outlet pressure value; and on the aspect of controlling at least one of the electric compressor, the heater, the first power unit, the second power unit and the turn-on control unit to operate according to the parameter information, the thermal management control module is specifically configured to:

when the outlet pressure value is greater than a first pressure value, control the electric compressor to operate at a second compression rotation speed, and control the condensation fan to operate at a first fan rotation speed;

when the outlet pressure value is less than a second pressure value, control the condensation fan to operate at a second fan rotation speed; and when the inlet pressure value is less than a third pressure value, control the electric compressor to operate at a third compression rotation speed, and control the condensation fan to operate at the second fan rotation speed;

the first pressure value being greater than the second pressure value; the second pressure value being greater than the third pressure value; the first fan rotation speed being greater than the second fan rotation speed; and the second compression rotation speed being greater than the third compression rotation speed.

Optionally, the thermal management system further includes:

an air blower configured to blow air to the refrigeration evaporator and/or the warm air heat exchanger;

when the parameter information includes the indoor temperature data, on the aspect of controlling at least one of the electric compressor, the heater, the first power unit, the second power unit and the turn-on control unit to operate according to the parameter information, the thermal management control module is specifically configured to:

when the thermal management request includes a cab cooling request, enter a third cooling control phase, such that the indoor temperature data is less than or equal to a target temperature value;

after the indoor temperature data is less than or equal to the target temperature value, stop the operation of the air blower, stop the operation of the electric compressor in the cab cooling circulation loop, and enter a fourth cooling control phase;

in the third cooling control phase, perform a cab cooling operation:

control the turn-on control unit, such that the cab cooling circulation loop is turned on; and determine whether a difference between the indoor temperature data and the target temperature value is greater than or equal to a fifth preset value, the target temperature value being from the thermal management request;

if yes, determine that the electric compressor operates at a first compression rotation speed and the air blower operates at a first air-blowing rotation speed; and if not, determine that the electric compressor operates at a second compression rotation speed and the air blower operates at a second air-blowing rotation speed;

in the fourth cooling control phase: each time when the indoor temperature data is greater than the target temperature value and the difference therebetween is greater than or equal to a sixth preset value, perform a first running control operation;

the first running control operation including:

restore the operation of the electric compressor in the cab cooling circulation loop, enable the electric compressor to operate at the second compression rotation speed, and enable the air blower to operate at the second air-blowing rotation speed;

after the indoor temperature data is less than or equal to the target temperature value, stop the operation of the air blower, stop the operation of the electric compressor in the cab cooling circulation loop;

the first compression rotation speed being greater than the second compression rotation speed; the first air-blowing rotation speed being greater than the second air-blowing rotation speed; the fifth preset value being greater than the sixth preset value;

when the thermal management request includes a cab heating request, enter a third heating control phase, such that the indoor temperature data is greater than or equal to the target temperature value;

after the indoor temperature data is greater than or equal to the target temperature value, stop the operation of the air blower, stop the operation of the heater and the second power unit in the cab heating circulation loop, and enter a fourth heating control phase;

in the third heating control phase, perform a cab heating operation:

control the turn-on control unit, such that the cab heating circulation loop is turned on;

determine whether the difference between the indoor temperature data and the target temperature value is greater than or equal to a seventh preset value;

if yes, enable the heater to operate at first heating power, the second power unit to operate at a third power rotation speed, and enable the air blower to operate at the first air-blowing rotation speed;

if not, enable the heater to operate at second heating power, enable the second power unit to operate at a fourth power rotation speed, and enable the air blower to operate at the second air-blowing rotation speed;

in the fourth heating control phase: each time when the indoor temperature data is less than the target temperature value and the difference therebetween is greater than or equal to an eighth preset value, perform a second running control operation;

the second running control operation including:

restore the operation of the heater and the second power unit in the cab heating circulation loop, enable the heater to operate at the second heating power, enable the second power unit to operate at the fourth power rotation speed, and enable the air blower to operate at the second air-blowing rotation speed; and after the indoor temperature data is greater than or equal to the target temperature value, stop the operation of the air blower, and stop the operation of the heater in the cab heating circulation loop;

the first heating power being greater than the second heating power; the third power rotation speed being greater than the fourth power rotation speed; and the seventh preset value being greater than the eighth preset value.

Optionally, when the parameter information includes the fluid temperature data and the indoor temperature data, on the aspect of controlling at least one of the electric compressor, the heater, the first power unit, the second power unit and the turn-on control unit to operate according to the parameter information, the thermal management control module is configured to:

when the battery cooling sub-loop, the cab cooling circulation loop and the refrigerant sub-loop are all turned on:
determine a first reference compression rotation speed of the electric compressor according to the fluid temperature data;
determine a second reference compression rotation speed of the electric compressor according to the indoor temperature data; and
control the electric compressor to operate according to a greater one of the first reference compression rotation speed and the second reference compression rotation speed; and
when the battery heating circulation loop and the cab heating circulation loop are both turned on:
determine first reference heating power of the heater and a first reference power rotation speed of the second power unit according to the fluid temperature data;
determine second reference heating power of the heater and a second reference power rotation speed of the second power unit according to the indoor temperature data;
control the heater to operate according to a greater one of the first reference heating power and the second reference heating power; and
control the second power unit to operate according to a greater one of the first reference power rotation speed and the second reference power rotation speed.

Optionally, the turn-on control unit includes:
a two-position three-way valve configured to perform turn-on switching between the battery cooling sub-loop and the battery heating circulation loop;
a first electronic valve configured to control turn-on and turn-off of the refrigerant sub-loop;
a second electronic valve configured to control turn-on and turn-off of the cab cooling circulation loop;
a third electronic valve configured to control turn-on and turn-off of the battery heating circulation loop; and
a fourth electronic valve configured to control turn-on and turn-off of the cab heating circulation loop.

Embodiments of the present disclosure further provide a thermal management system for an electric forklift, where the electric forklift is provided with an air conditioning device, and the thermal management system includes:
a battery cooling circulation loop, including a battery cooling sub-loop and a refrigerant sub-loop, where the battery cooling sub-loop includes a battery temperature regulator and a first power unit connected through a pipeline, and a cooling liquid cavity of a heat exchanger; and the refrigerant sub-loop includes an electric compressor, a condenser and a first expansion valve connected through a pipeline, and a refrigerant cavity of the heat exchanger;
a battery heating circulation loop including a heater, a second power unit and the battery temperature regulator connected through a pipeline, where
the electric compressor, the condenser, the heater and the second power unit are provided by the air conditioning device;
a turn-on control unit configured to separately control turn-on and turn-off of the battery cooling sub-loop, the refrigerant sub-loop, the battery heating circulation loop, and the cab cooling circulation loop and the cab heating circulation loop in the air conditioning device; and a thermal management control module connected to a battery management controller in the electric forklift and a control panel in the air conditioning device, and configured to:
control at least one of the electric compressor, the heater, the first power unit, the second power unit and the turn-on control unit to operate according to parameter information, where the parameter information includes a thermal management request inputted from the outside and at least one of battery temperature data transmitted by the battery management controller; the thermal management request is configured to regulate a cab temperature and/or a battery temperature;
the first power unit is configured to provide power to a fluid working medium in the battery cooling sub-loop; and the second power unit is configured to provide power to a fluid working medium in the battery heating circulation loop and/or the cab heating circulation loop.

Embodiments of the present disclosure further provide a thermal management system for an electric forklift, where the thermal management system includes:
a battery cooling circulation loop, including a battery cooling sub-loop and a refrigerant sub-loop, where the battery cooling sub-loop includes a battery temperature regulator and a first power unit connected through a pipeline, and a cooling liquid cavity of a heat exchanger; and the refrigerant sub-loop includes an electric compressor, a condenser and a first expansion valve connected through a pipeline, and a refrigerant cavity of the heat exchanger;
a battery heating circulation loop including a heater, a second power unit and the battery temperature regulator connected through a pipeline;
a cab cooling circulation loop, including a refrigeration evaporator and a second expansion valve connected through a pipeline, and the electric compressor and a condenser, where the refrigeration evaporator is disposed in a cab of an electric forklift;
a cab heating circulation loop including a warm air heat exchanger, the heater and the second power unit connected through a pipeline, where the warm air heat exchanger is disposed in the cab;
a two-position three-way valve provided at a junction between the battery cooling sub-loop and the battery heating circulation loop, and configured to perform turn-on switching between the battery cooling sub-loop and the battery heating circulation loop;
a first electronic valve provided in the refrigerant sub-loop, and configured to control turn-on and turn-off of the refrigerant sub-loop;
a second electronic valve provided in the cab cooling circulation loop, and configured to control turn-on and turn-off of the cab cooling circulation loop;
a third electronic valve provided in the battery heating circulation loop, and configured to control turn-on and turn-off of the battery heating circulation loop; and
a fourth electronic valve provided in the cab heating circulation loop, and configured to control turn-on and turn-off of the cab heating circulation loop, where
the first power unit is configured to provide power to a fluid working medium in the battery cooling sub-loop; and the second power unit is configured to provide power to a fluid working medium in the battery heating circulation loop and/or the cab heating circulation loop.

According to specific embodiments provided in the present disclosure, the present disclosure has the following technical effects:

In the thermal management system for an electric forklift provided in the embodiments of the present disclosure, the battery cooling circulation loop, the battery heating circulation loop, the cab cooling circulation loop and the cab heating circulation loop are provided. In the aspect of battery cooling, the battery cooling circulation loop includes the battery cooling sub-loop and the refrigerant sub-loop. Specifically, under the driving of the first power unit, the fluid working medium in the battery cooling sub-loop can circularly flow, and can pass through the cooling liquid cavity and the battery temperature regulator during flowing. In this way, when the electric compressor in the refrigerant sub-loop drives the refrigerant to flow through the refrigerant cavity, the refrigerant can exchange heat with the fluid working medium flowing through the cooling liquid cavity to cool the fluid working medium. When the cooled fluid working medium flows through the battery temperature regulator (located in a battery pack), a battery module in the battery pack can be cooled.

In the aspect of battery heating: under the driving of the second power unit, the fluid working medium in the battery heating circulation loop can circularly flow, and can pass through the heater and the battery temperature regulator during flowing. In this way, the heater can heat the fluid working medium in the battery heating circulation loop. When the heated fluid working medium flows through the battery temperature regulator, the battery module can be heated.

In the aspect of cab refrigeration: the cab cooling circulation loop and the refrigerant sub-loop are connected in parallel, and share the electric compressor and the condenser. The electric compressor drives the refrigerant to flow through the refrigeration evaporator (located in the cab) to cool the cab.

In the aspect of cab heating: the cab heating circulation loop and the battery heating circulation loop are connected in parallel, and share the heater and the second power unit. Under the driving of the second power unit, the fluid working medium heated by the heater flows through the warm air heat exchanger (located in the cab) to heat the cab.

Moreover, the thermal management control module can separately control turn-on and turn-off of the battery cooling sub-loop, the refrigerant sub-loop, the battery heating circulation loop, the cab cooling circulation loop and the cab heating circulation loop through the turn-on control unit.

Furthermore, the thermal management control module controls at least one of the electric compressor, the heater, the first power unit, the second power unit and the turn-on control unit to operate according to the parameter information (battery temperature data and/or thermal management request), such that thermal management (including refrigeration and heating) can be separately performed on the battery and the cab.

BRIEF DESCRIPTION OF THE DRAWINGS

FIG. 1s a schematic diagram of a thermal management system provided in embodiments of the present disclosure.

REFERENCE NUMERALS

1—Battery temperature regulator, 2—Heat exchanger, 201—Refrigerant cavity, 202—Cooling liquid cavity, 3—First power unit, 4—Electric compressor, 5—Condenser, 6—Condensation fan, 7—First expansion valve, 8—Refrigeration evaporator, 9—Second expansion valve, 10—Second power unit, 11—Heater, 12—Warm air heat exchanger, 13—Air blower, 141—Two-position three-way valve, 142—First electronic valve, 143—Second electronic valve, 144—Third electronic valve, 145—Fourth electronic valve, 15—Storage container, 161—First temperature sensor, 162—Second temperature sensor, 163—Third temperature sensor, 171—First pressure sensor, and 172—Second pressure sensor.

DETAILED DESCRIPTION OF THE EMBODIMENTS

The embodiments of the present disclosure will be described below with reference to the accompanying drawings.

An objective of the present disclosure is to provide a thermal management system for an electric forklift, which can meet thermal management requirements of a cab and a battery in the electric forklift at the same time.

Figure 1:
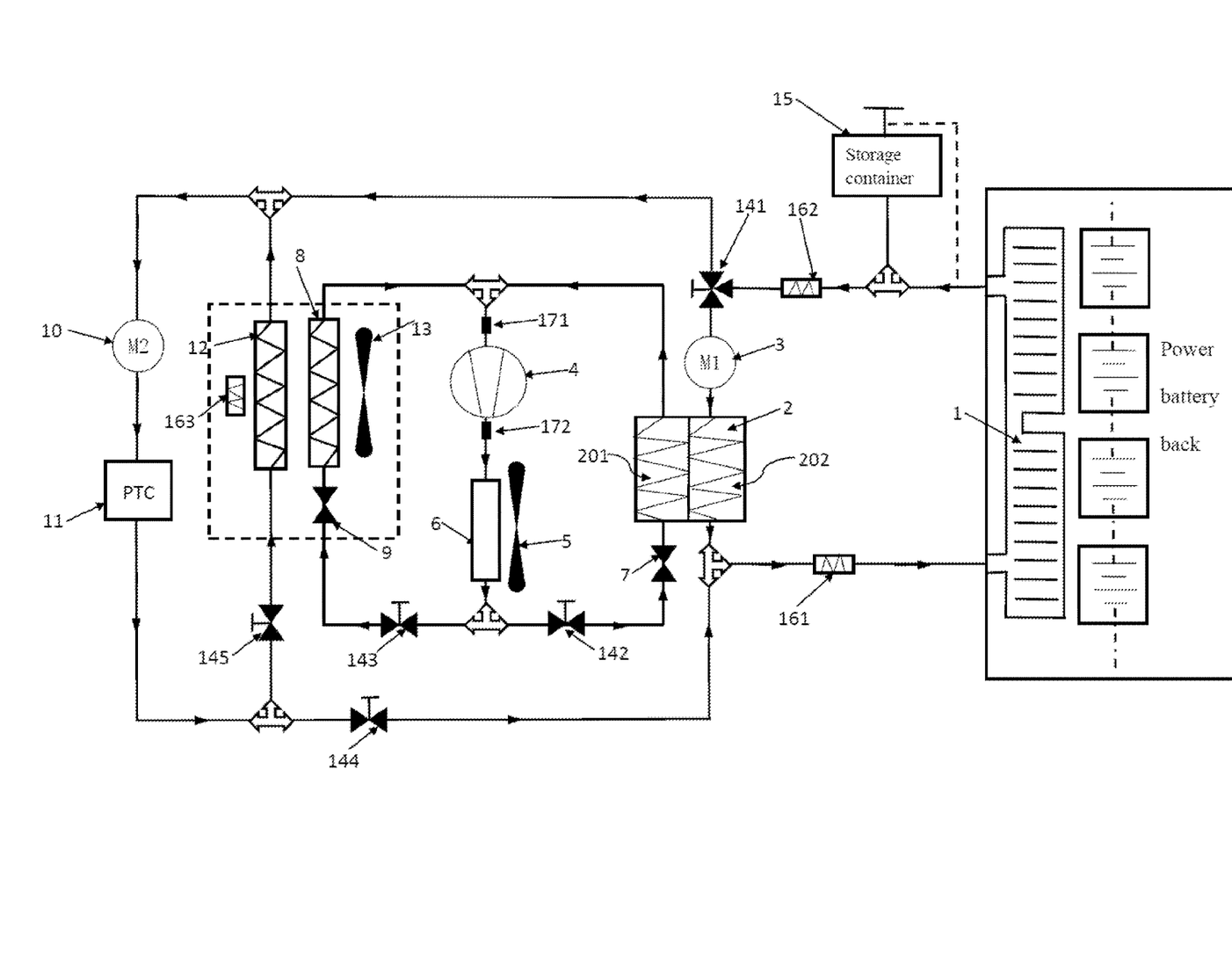

As shown in FIG. 1, the thermal management system for an electric forklift includes a battery cooling circulation loop, a battery heating circulation loop, a cab cooling circulation loop, a cab heating circulation loop, a turn-on control unit, and a thermal management control module.

Specifically, the battery cooling circulation loop includes a battery cooling sub-loop and a refrigerant sub-loop. The battery cooling sub-loop includes a battery temperature regulator 1 and a first power unit 3 connected through a pipeline, and a cooling liquid cavity 202 of a heat exchanger 2. The refrigerant sub-loop includes an electric compressor 4, a condenser 5 and a first expansion valve 7 connected through a pipeline, and a refrigerant cavity 201 of the heat exchanger 2.

The heat exchanger 2 may be, for example, a plate heat exchanger 2, internally provided with the refrigerant cavity 201 and the cooling liquid cavity 202. When passing through the refrigerant cavity 201, the refrigerant evaporates and absorbs heat to cool the fluid working medium in the cooling liquid cavity 202, thereby implementing heat exchange.

Specifically, under the driving of the first power unit 3 (such as an electronic water pump), the fluid working medium in the battery cooling sub-loop circularly flows through the cooling liquid cavity 202 for cooling, and the cooled fluid working medium flows through the battery temperature regulator 1 to cool the battery module.

The battery heating circulation loop includes a heater 11, a second power unit 10 and the battery temperature regulator 1 connected through a pipeline.

Specifically, the fluid working medium in the battery heating circulation loop is heated by the heater 11, and under the driving of the second power unit 10 (such as an electronic water pump), the heated fluid working medium flows through the battery temperature regulator 1 to heat the battery module. The heater 115 may be, for example, a water heating positive temperature coefficient (PTC).

Furthermore, the battery temperature regulator 1 may be a plate structure or a tube structure, such as a water cooling plate and a water cooling tube.

The temperature of the battery module is regulated by the battery temperature regulator 1 attached to the outer surface, and compared with cooling through cross-ventilation of air (air cooling) in the prior art, the cooling efficiency is higher, and the increase of maintenance cost caused by allowing external dust, moisture or the like to enter the battery pack can be avoided. Moreover, compared with heating by pasting a heating film to the surface of a cell in the prior art, the heating temperature can be regulated at any time, the safety risk is low, and the damage to the battery module by higher temperature can be effectively avoided.

The cab cooling circulation loop includes a refrigeration evaporator 8 and a second expansion valve 9 connected through a pipeline, and the electric compressor 4 and a condenser 5. The refrigeration evaporator 8 is disposed in a cab of the electric forklift.

The cab cooling circulation loop and the refrigerant sub-loop are connected in parallel, and share the electric compressor 4 and the condenser 5.

The cab heating circulation loop includes a warm air heat exchanger 12, the heater 11 and a second power unit 10 connected through a pipeline. The warm air heat exchanger 12 is disposed in the cab.

The cab heating circulation loop and the battery heating circulation loop are connected in parallel, and share the heater 11 and the second power unit 10. Specifically, under the driving of the second power unit 10, the fluid working medium heated by the heater 11 flows through the warm air heat exchanger 12 to heat the cab.

The turn-on control unit is configured to separately control turn-on and turn-off of the battery cooling sub-loop, the refrigerant sub-loop, the battery heating circulation loop, the cab cooling circulation loop and the cab heating circulation loop.

Specifically, the turn-on control unit includes a two-position three-way valve 141, a first electronic valve 142, a second electronic valve 143, a third electronic valve 144 and a fourth electronic valve 145, which are separately connected to the thermal management control module.

Furthermore, the two-position three-way valve 141 is disposed at a junction between the battery cooling sub-loop and the battery heating circulation loop, and is configured to perform turn-on switching between the battery cooling sub-loop and the battery heating circulation loop. The first electronic valve 142 is provided in the refrigerant sub-loop, and is configured to control turn-on and turn-off of the refrigerant sub-loop. The second electronic valve 143 is provided in the cab cooling circulation loop, and is configured to control turn-on and turn-off of the cab cooling circulation loop. The third electronic valve 144 is provided in the battery heating circulation loop, and is configured to control turn-on and turn-off of the battery heating circulation loop. The fourth electronic valve 145 is provided in the cab heating circulation loop, and is configured to control turn-on and turn-off of the cab heating circulation loop.

The thermal management control module is connected to a battery management controller in the electric forklift, and is configured to:
control at least one of the electric compressor 4, the heater 11, the first power unit 3, the second power unit 4 and the turn-on control unit to operate according to the parameter information. The parameter information includes a thermal management request and at least one of battery temperature data transmitted by the battery management controller.

The thermal management request is configured to regulate a cab temperature and/or a battery temperature. In the aspect of regulating the battery temperature, an instruction of regulating the battery temperature in the thermal management request may be specifically from the battery management controller in the electric forklift.

In the aspect of regulating the cab temperature, an instruction of regulating the cab temperature in the thermal management request may be specifically sent by a driver, such as turn-on, turn-off, heating and cooling. A mode of sending the instruction by the driver may be flexibly selected according to actual situations, such as employing a remote controller, a touch screen and a microphone.

The thermal management control module may be, for example, a processor, an upper computer, and a server.

The thermal management system provided in the embodiments of the present disclosure can regulate the temperature of the battery and the temperature of the cab in the electric forklift at the same time. That is, a set of thermal management system can meet thermal management requirements (heating and cooling) of the cab and the battery at the same time.

Furthermore, on the aspect of controlling at least one of the electric compressor 4, the heater 11, the first power unit 3, the second power unit 10 and the turn-on control unit to operate according to the parameter information, the thermal management control module is specifically configured to:
when the thermal management request includes a battery cooling request, and/or when the battery temperature data is higher than a first threshold (the battery temperature is too high and needs to be reduced):
control the turn-on control unit, such that the battery cooling sub-loop and the refrigerant sub-loop are both turned on, and the battery heating circulation loop is turned off;
enable the electric compressor 4 to operate, such that a refrigerant flows through the refrigerant cavity 201 to cool the fluid working medium in the cooling liquid cavity 202; and
control the first power unit 3 to operate, such that the fluid working medium in the battery cooling sub-loop circularly flows.

When the thermal management request includes a battery heating request, and/or when the battery temperature data is lower than a second threshold (the battery temperature is too low and needs to be increased):
control the turn-on control unit, such that the battery heating circulation loop is turned on, and the battery cooling sub-loop is turned off;
enable the heater 11 to heat the fluid working medium in the battery heating circulation loop; and
control the second power unit 10 to operate, such that the fluid working medium in the battery heating circulation loop circularly flows.

When the thermal management request includes a cab cooling request:
control the turn-on control unit, such that the cab cooling circulation loop is turned on; and
enable the electric compressor 4 to operate, such that the refrigerant flows through the refrigeration evaporator 8.

When the thermal management request includes a cab heating request:
control the turn-on control unit, such that the cab heating circulation loop is turned on;
control the second power unit 10 to operate, such that the fluid working medium in the cab heating circulation loop circularly flows;
enable the heater 11 to heat the fluid working medium in the cab heating circulation loop.

For example, the first threshold and the second threshold may be respectively set to be 35° C. and 0° C.; and the specific values may be flexibly selected according to actual situations.

The fluid working medium may be, for example, a glycol aqueous solution.

In one example, the thermal management system further includes a storage container 15 configured to store the fluid working medium. The arrangement of the storage container 15 can ensure sufficient amount of the fluid working medium in each circulation loop.

In one embodiment, the thermal management system further includes a temperature measurement unit.

the temperature measurement unit is configured to measure and obtain fluid temperature data, where the fluid temperature data includes at least one of temperatures of the fluid working medium flowing through an inlet end, an interior and an outlet end of the battery temperature regulator 1.

Correspondingly, the parameter information may further include fluid temperature data.

When obtaining the fluid temperature data, the temperature measurement unit can either directly measure the temperature of the fluid working medium inside a pipeline or measure the temperature of the outer wall of the pipeline.

Furthermore, taking an example where the fluid temperature data includes the fluid temperatures at the inlet end and the outlet end of the battery temperature regulator 1, please refer to FIG. 1, which can be respectively measured and obtained by a first temperature sensor 161 and a second temperature sensor 162 in the temperature measurement unit.

Correspondingly, when the parameter information includes fluid temperature data (the fluid temperatures at the inlet end and the outlet end of the battery temperature regulator), on the aspect of controlling at least one of the electric compressor 4, the heater 11, the first power unit 3, the second power unit 10 and the turn-on control unit to operate according to the parameter information, the thermal management control module is configured to:

when the thermal management request includes a battery cooling request, and/or when the battery temperature data is higher than a first threshold:

if the fluid temperature at the inlet end is less than or equal to a first target value, turn on the battery cooling sub-loop, turn off the battery heating circulation loop, enable the first power unit 3 to operate at a second power rotation speed, and enter a second cooling control phase; and if the fluid temperature at the inlet end is greater than the first target value, enter a first cooling control phase;

in the first cooling control phase:

control the turn-on control unit, such that the battery cooling sub-loop and the refrigerant sub-loop are both turned on, and the battery heating circulation loop is turned off;

determine whether a difference between the fluid temperature at the outlet end and the first target value is greater than or equal to a first preset value;

if yes, determine that the first power unit 3 and the electric compressor 4 respectively operate at a first power rotation speed and a first compression rotation speed; and if not, determine that the first power unit 3 operates at the second power rotation speed, and the electric compressor 4 operates at a second compression rotation speed;

after the fluid temperature at the inlet end is less than or equal to the first target value, stop the operation of the electric compressor 4 in the refrigerant sub-loop, and enter the second cooling control phase;

in the second cooling control phase:

each time when the fluid temperature at the inlet end (or, which may also be the outlet end) is greater than the first target value and a difference therebetween is greater than or equal to a second preset value, perform an electric compressor control operation;

the electric compressor control operation including:

start the operation of the electric compressor 4 in the refrigerant sub-loop, and determine that the electric compressor 4 operates at the second compression rotation speed;

after the fluid temperature at the inlet end is less than or equal to the first target value, stop the operation of the electric compressor 4 in the refrigerant sub-loop;

the first power rotation speed being greater than the second power rotation speed; the first compression rotation speed being greater than the second compression rotation speed; the first preset value being greater than the second preset value; and specific values of the parameters being flexibly selected according to requirements.

It should be noted that in the aspect of stopping the operation of the electric compressor 4 in the refrigerant sub-loop, the operation of the electric compressor 4 can be stopped (when the cab does not need to be refrigerated), and the refrigerant sub-loop can also be turned off by controlling the first electronic valve 142.

For the principle of performing the battery cooling operation, reference is made as follows:

In the initial stage of battery design, the target cooling temperature (first target value) and the target heating temperature (second target value) of the fluid working medium at the inlet of the battery temperature regulator 1 can be obtained by means of simulation, test and the like. When the temperature of the fluid working medium at the inlet of the battery temperature regulator 1 reaches the first target value or the second target value, the cooling or heating requirements of the battery module can be met.

Therefore, when the battery needs to be cooled:

when the fluid temperature at the inlet end is greater than the first target value (such as 20° C.):

If the fluid temperature at the outlet end is greater than a first calibrated value (such as 28° C.), it can be considered that the current fluid temperature is greatly different from the target cooling temperature (greater than the first preset value), and a greater cooling capacity is needed to cool the fluid working medium. At this time, the first power unit 3 can be enabled to operate at the first power rotation speed (such as 100% rotation speed), and the electric compressor 4 can be enabled to operate at the first compression rotation speed (such as 4,000 rpm).

If the fluid temperature at the outlet end is less than the first calibrated value (such as 28° C.), it can be considered that the current fluid temperature is less different from the target cooling temperature (less than the first preset value), and a smaller cooling capacity is needed to cool the fluid working medium. At this time, the first power unit 3 can be enabled to operate at the second power rotation speed (such as 80% rotation speed), and the electric compressor 4 can be enabled to operate at the second compression rotation speed (such as 2,000 rpm).

It should be noted that in some special scenes, the battery needs to be cooled, and the fluid temperature at the inlet end will be less than or equal to the first target value (such as 20° C.). For example, in winter, the battery inside the battery pack generates heat, and the temperature of the fluid in the internal pipeline of the battery pack increases, while the temperature of the fluid in the external pipeline of the battery pack remains low. At this time, it is only necessary to first operate the first power unit 3 at the second power rotation speed (such as 80% rotation speed), such that the fluid working medium in the battery cooling sub-loop circularly flows.

If the fluid temperature at the inlet end is less than the first target value, but the temperature gradually increases along with time, when the fluid temperature is greater than or equal to a second calibrated value (such as 25° C.), it can be considered that the fluid temperature is less different from the target cooling temperature (corresponding to the second preset value). At this time, the first power unit 3 can be enabled to operate at the second power rotation speed (such as 80% rotation speed), and the electric compressor 4 can be enabled to operate at the second compression rotation speed (such as 2,000 rpm).

Furthermore, when the thermal management request includes a battery heating request, and/or when the battery temperature data is lower than a second threshold, a first heating control phase proceeds, such that the fluid temperature at the inlet end is greater than or equal to the second target value.

After the fluid temperature at the inlet end is greater than or equal to the second target value, the operation of the heater 11 in the battery heating circulation loop is stopped, and a second heating control phase proceeds.

In the first heating control phase:
  if the fluid temperature at the inlet end is less than the second target value, a battery heating operation is performed:
  control the turn-on control unit, such that the battery heating circulation loop is turned on, and the battery cooling sub-loop is turned off;
  determine whether a difference between the fluid temperature at the outlet end and the second target value is greater than a third preset value;
  if yes, enable the second power unit 10 to operate at a third power rotation speed, and enable the heater 11 to operate at first heating power;
  if not, enable the second power unit 10 to operate at a fourth power rotation speed, and enable the heater 11 to operate at second heating power.

In the second heating control phase: each time when the fluid temperature at the inlet end (which may also be the outlet end) is greater than the second target value and a difference therebetween is greater than or equal to a fourth preset value, perform a heater control operation.

The heater control operation includes:
  restore the operation of the heater 11 in the battery heating circulation loop, and enable the heater 11 to operate at the second heating power; and
  after the fluid temperature at the inlet end is greater than or equal to the second target value, stop the operation of the heater 11 in the battery heating circulation loop, where
  the first heating power is greater than the second heating power; the third power rotation speed is greater than the fourth power rotation speed; the third preset value is greater than the fourth preset value; the first threshold is greater than the second threshold; and specific values of the parameters can be flexibly selected according to requirements.

It should be noted that in the aspect of stopping the operation of the heater 11 in the battery heating circulation loop, the operation of the heater 11 can be stopped (when the cab does not need to be heated), and the battery heating circulation loop can also be turned off by controlling the third electronic valve 144.

For the principle of performing the battery heating operation, reference is made as follows:
  when the battery needs to be heated, and the fluid temperature at the inlet end is lower than the second target value (such as 40° C.):
  If the fluid temperature at the outlet end is lesser than a third calibrated value (such as 20° C.), it can be considered that the current fluid temperature is greatly different from the target heating temperature (greater than the third preset value), and a greater heating capacity is needed to heat the fluid working medium. At this time, the second power unit 10 can be enabled to operate at the third power rotation speed (such as 100% rotation speed), and the heater 11 can be enabled to operate at the first heating power (such as 2 kW).

If the fluid temperature at the outlet end is greater than the third calibrated value (such as 20° C.), it can be considered that the current fluid temperature is less different from the target heating temperature (less than the third preset value), and a smaller heating capacity is needed to heat the fluid working medium. At this time, the second power unit 10 can be enabled to operate at the fourth power rotation speed (such as 80% rotation speed), and the heater 11 can be enabled to operate at the second heating power (such as 1 kW).

If the fluid temperature at the inlet end is higher than the second target value, but the temperature gradually decreases along with time, when the fluid temperature is greater than or equal to the fourth calibrated value (such as 30° C.), it can be considered that the fluid temperature is less different from the target heating temperature (corresponding to the fourth preset value). At this time, the second power unit 10 can be enabled to operate at the fourth power rotation speed (such as 80% rotation speed), and the heater 11 can be enabled to operate at the second heating power (such as 1 kW).

In one example, the temperature measurement unit may also be configured to: measure the temperature in the cab to obtain indoor temperature data. The indoor temperature data can be specifically measured and obtained through a third temperature sensor 163 in the temperature measurement unit.

Correspondingly, the parameter information may further include indoor temperature data.

When the Cab Needs to be Cooled:
  If the indoor temperature data is less different from a target temperature value inputted by a driver (for example, the difference is 5° C.), the electric compressor 47 only needs to provide a smaller refrigeration capacity at a lower second compression rotation speed (such as 2,000 rpm), thereby reducing the energy consumption of the electric compressor 47; and
  if the indoor temperature data is greatly different from the target temperature value (for example, the difference is 10° C.), the electric compressor 47 needs to provide a larger refrigeration capacity at a higher first compression rotation speed (such as 4,000 rpm), thereby quickly cooling the cab.

When the Cab Needs to be Heated:
  If the indoor temperature data is less different from the target temperature value (for example, the difference is 5° C.), the heater 11 only needs to perform heating at lower second heating power (such as 1 kW); and
  If the indoor temperature data is greatly different from the target temperature value (for example, the difference is 10° C.), the heater 11 needs to perform heating at higher first heating power (such as 2 kW).

Furthermore, the thermal management system further includes:
- an air blower 13 configured to blow air to the refrigeration evaporator 8 and/or the warm air heat exchanger 12.

When the parameter information includes the indoor temperature data, on the aspect of controlling at least one of the electric compressor 4, the heater 11, the first power unit 3, the second power unit 10 and the turn-on control unit to operate according to the parameter information, the thermal management control module is specifically configured to:
- when the thermal management request includes a cab cooling request, enter a third cooling control phase, such that the indoor temperature data is less than or equal to the target temperature value; and
- after the indoor temperature data is less than or equal to the target temperature value, stop the operation of the air blower 13, stop the operation of the electric compressor 4 in the cab cooling circulation loop, and enter a fourth cooling control phase.

It should be noted that in the aspect of stopping the operation of the electric compressor 4 in the cab cooling circulation loop, the operation of the electric compressor 4 can be stopped (when the battery does not need to be refrigerated), and the cab cooling circulation loop can also be turned off by controlling the second electronic valve 143.

In the third cooling control phase, a cab cooling operation is performed:
- control the turn-on control unit, such that the cab cooling circulation loop is turned on;
- determine whether a difference between the indoor temperature data and the target temperature value is greater than or equal to a fifth preset value, the target temperature value being from the thermal management request;
- if yes, determine that the electric compressor 4 operates at a first compression rotation speed and the air blower operates 13 at a first air-blowing rotation speed; and
- if not, determine that the electric compressor 4 operates at a second compression rotation speed and the air blower 14 operates at a second air-blowing rotation speed.

In the fourth cooling control phase: each time when the indoor temperature data is greater than the target temperature value and the difference therebetween is greater than or equal to a sixth preset value, a first running control operation is performed.

The first running control operation includes:
- restore the operation of the electric compressor 4 in the cab cooling circulation loop, enable the electric compressor 4 to operate at the second compression rotation speed, and enable the air blower 13 to operate at the second air-blowing rotation speed; and
- after the indoor temperature data is less than or equal to the target temperature value, stop the operation of the air blower 13, stop the operation of the electric compressor 4 in the cab cooling circulation loop, where the first compression rotation speed is greater than the second compression rotation speed; the first air-blowing rotation speed is greater than the second air-blowing rotation speed; the fifth preset value is greater than the sixth preset value; and specific values of the parameters can be flexibly selected according to requirements.

When the thermal management request includes a cab heating request, a third heating control phase proceeds, such that the indoor temperature data is greater than or equal to the target temperature value.

After the indoor temperature data is greater than or equal to the target temperature value, the operation of the air blower 13 is stopped, the operation of the heater 11 and the second power unit 10 in the cab heating circulation loop is stopped, and a fourth heating control phase proceeds.

It should be noted that in the aspect of stopping the operation of the heater 11 and the second power unit 10 in the cab heating circulation loop, the operation of the heater 11 and the second power unit 10 can be stopped (when the battery does not need to be heated), and the cab heating circulation loop can also be turned off by controlling the fourth electronic valve 145.

In the third heating control phase, a cab heating operation is performed:
- control the turn-on control unit, such that the cab heating circulation loop is turned on;
- determine whether the difference between the indoor temperature data and the target temperature value is greater than or equal to a seventh preset value;
- if yes, enable the heater 11 to operate at first heating power, the second power unit 10 to operate at a third power rotation speed, and enable the air blower 13 to operate at the first air-blowing rotation speed; and
- if not, enable the heater 11 to operate at second heating power, enable the second power unit 10 to operate at a fourth power rotation speed, and enable the air blower 13 to operate at the second air-blowing rotation speed.

In the fourth heating control phase: each time when the indoor temperature data is less than the target temperature value and the difference therebetween is greater than or equal to an eighth preset value, a second running control operation is performed.

The second running control operation includes:
- restore the operation of the heater 11 and the second power unit 10 in the cab heating circulation loop, enable the heater 11 to operate at the second heating power, enable the second power unit 10 to operate according to the fourth power rotation speed, and enable the air blower 13 to operate at the second air-blowing rotation speed; and
- after the indoor temperature data is greater than or equal to the target temperature value, stop the operation of the air blower 13, and stop the operation of the heater 11 in the cab heating circulation loop, where the first heating power is greater than the second heating power; the third power rotation speed is greater than the fourth power rotation speed; the third preset value is greater than the fourth preset value; and specific values of the parameters can be flexibly selected according to requirements.

Furthermore, it should be noted that when the parameter information includes the fluid temperature data and the indoor temperature data, and the battery module and the cab are cooled or heated at the same time, it should be able to meet the highest demand state.

Specifically, when the parameter information includes the fluid temperature data and the indoor temperature data, on the aspect of controlling at least one of the electric compressor 4, the heater 11, the first power unit 3, the second power unit 10 and the turn-on control unit to operate according to the parameter information, the thermal management control module is specifically configured to:
- when the battery cooling sub-loop, the cab cooling circulation loop and the refrigerant sub-loop are all turned on (the battery and the cab are refrigerated at the same time):
- determine a first reference compression rotation speed of the electric compressor according to the fluid temperature data;

determine a second reference compression rotation speed of the electric compressor according to the indoor temperature data; and control the electric compressor to operate according to a greater one of the first reference compression rotation speed and the second reference compression rotation speed; and when the battery heating circulation loop and the cab heating circulation loop are both turned on (the battery and the cab are heated at the same time):

determine first reference heating power of the heater and a first reference power rotation speed of the second power unit according to the fluid temperature data;

determine second reference heating power of the heater and a second reference power rotation speed of the second power unit according to the indoor temperature data;

control the heater to operate according to a greater one of the first reference heating power and the second reference heating power; and control the second power unit to operate according to a greater one of the first reference power rotation speed and the second reference power rotation speed.

For example, when the cab and the battery module need to be cooled at the same time, according to the cab frequency conversion logic, the electric compressor 4 should run at the first compression rotation speed of 4,000 rpm, and according to the battery frequency conversion logic, the electric compressor 4 should run at the second compression rotation speed of 2,000 rpm. At this time, the thermal management control module actually controls the electric compressor 4 to run at 4,000 rpm. If the temperature demand of the battery module is met first during this process, the cooling of the battery module is stopped and a single cab cooling mode proceeds.

Similarly, when the cab and the battery module need to be heated at the same time, according to the cab frequency conversion logic, the heater 11 needs to run at the second heating power of 1 kW, and according to the battery logic, the heater 11 needs to run at the first heating power of 2 kW. At this time, the thermal management control module actually controls the heater 11 to run at 2 kW. If the temperature demand of the cab is met first during this process, the heating of the cab is stopped and a single battery heating mode proceeds.

In one example, the thermal management system further includes:

a pressure measurement unit configured to separately measure pressures of an inlet end pipeline and an outlet end pipeline of the electric compressor 4 to obtain an inlet pressure value and an outlet pressure value; and a condensation fan 6 configured to blow air to the condenser 5.

The inlet pressure value and the outlet pressure value can be respectively measured and obtained by a first pressure sensor 171 and a second pressure sensor 172 in the pressure measurement unit.

When the parameter information further includes the inlet pressure value and the outlet pressure value, on the aspect of controlling at least one of the electric compressor 4, the heater 11, the first power unit 3, the second power unit 10 and the turn-on control unit to operate according to the parameter information, the thermal management control module is specifically configured to:

I. when the outlet pressure value is greater than a first pressure value, control the electric compressor 4 to operate at a second compression rotation speed, and control the condensation fan 6 to operate at a first fan rotation speed, where at this time, it can be considered that the load of the electric compressor 4 is too large, so the condensation fan 6 is running at a higher rotation speed, such that the condenser 5 quickly dissipates heat to reduce the high pressure of the electric compressor 4; at the same time, the electric compressor 4 is prevented from running at a higher speed (first compression rotation speed) to ensure that the electric compressor 4 is not damaged;

II. when the outlet pressure value is less than a second pressure value, control the condensation fan 6 to operate at a second fan rotation speed, where at this time, it can be considered that the load of the electric compressor 4 is small, and the rotation speed of the condensation fan 6 is appropriately reduced to save energy; and III. when the inlet pressure value is less than a third pressure value, control the electric compressor 4 to operate at a third compression rotation speed, and control the condensation fan 6 to operate at the second fan rotation speed, where at this time, it can be considered that there is insufficient refrigerant in the pipeline, so the electric compressor 4 and the condensation fan 6 are running at a lower speed; and the first pressure value is greater than the second pressure value; the second pressure value is greater than the third pressure value; the first fan rotation speed is greater than the second fan rotation speed; the second compression rotation speed is greater than the third compression rotation speed; and specific values of the parameters can be flexibly selected according to requirements.

In addition, it should be noted that the rotation speed regulation of the electric compressor 4 based on the inlet pressure value and the outlet pressure value has a higher priority than the regulation based on the fluid temperature data and/or the indoor temperature data. For example, when it is necessary to control the electric compressor 4 to operate at the second compression rotation speed according to the outlet pressure value, and according to the fluid temperature data and/or the indoor temperature data, it is determined that the electric compressor 4 should be running at the first compression rotation speed, the thermal management control module actually controls the electric compressor 4 to operate at the second compression rotation speed.

In conclusion, the thermal management system for an electric forklift provided in the embodiments of the present disclosure can cool or heat the cab while cooling or heating the battery of the electric forklift. One set of thermal management system can meet thermal management requirements of the cab and the battery at the same time.

In addition, it should be noted that during actual applications, the cab of the electric forklift may have its own air conditioning device, and the electric compressor 4, the condenser 5, the heater 11 and the second power unit 10 may be provided by the air conditioning device of the cab. That is to say, the cab cooling circulation loop and the cab heating circulation loop belong to a part of the air conditioning device. Correspondingly, the thermal management control module is separately connected to the battery management controller in the electric forklift and the control panel in the air conditioning device. The thermal management request is from the control panel.

Each embodiment in the description is described in a progressive mode, each embodiment focuses on differences from other embodiments, and references can be made to each other for the same and similar parts between embodiments. Since the system disclosed in an embodiment corresponds to the method disclosed in an embodiment, the description is relatively simple, and for related contents, references can be made to the description of the method.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. A thermal management system for an electric forklift, wherein the thermal management system comprises:
a battery cooling circulation loop, comprising a battery cooling sub-loop and a refrigerant sub-loop, wherein the battery cooling sub-loop comprises a battery temperature regulator and a first power unit connected through a pipeline, and a cooling liquid cavity of a heat exchanger; and the refrigerant sub-loop comprises an electric compressor, a condenser and a first expansion valve connected through a pipeline, and a refrigerant cavity of the heat exchanger;
a battery heating circulation loop comprising a heater, a second power unit and the battery temperature regulator connected through a pipeline;
a cab cooling circulation loop, comprising a refrigeration evaporator and a second expansion valve connected through a pipeline, and the electric compressor and a condenser, wherein the refrigeration evaporator is disposed in a cab of an electric forklift;
a cab heating circulation loop comprising a warm air heat exchanger, the heater and the second power unit connected through a pipeline, wherein the warm air heat exchanger is disposed in the cab;
a turn-on control unit configured to separately control turn-on and turn-off of the battery cooling sub-loop, the refrigerant sub-loop, the battery heating circulation loop, the cab cooling circulation loop and the cab heating circulation loop; and
a thermal management control module connected to a battery management controller in the electric forklift, and configured to:
control at least one of the electric compressor, the heater, the first power unit, the second power unit and the turn-on control unit to operate according to parameter information, wherein the parameter information comprises a thermal management request and at least one of battery temperature data transmitted by the battery management controller; and the thermal management request is configured to regulate a cab temperature and/or a battery temperature;
wherein, the first power unit is configured to provide power to a fluid working medium in the battery cooling sub-loop; and the second power unit is configured to provide power to a fluid working medium in the battery heating circulation loop and/or the cab heating circulation loop.

2. The thermal management system for an electric forklift according to claim 1, wherein the thermal management system further comprises:
a temperature measurement unit configured to measure and obtain fluid temperature data, and/or measure a temperature in the cab of the electric forklift to obtain indoor temperature data, wherein the fluid temperature data comprises at least one of temperatures of the fluid working medium flowing through an inlet end, an interior and an outlet end of the battery temperature regulator; and
the parameter information further comprises the fluid temperature data and/or the indoor temperature data.

3. The thermal management system for an electric forklift according to claim 1, wherein on the aspect of controlling at least one of the electric compressor, the heater, the first power unit, the second power unit and the turn-on control unit to operate according to the parameter information, the thermal management control module is specifically configured to:
when the thermal management request comprises a battery cooling request, and/or when the battery temperature data is higher than a first threshold:
control the turn-on control unit, such that the battery cooling sub-loop and the refrigerant sub-loop are both turned on, and the battery heating circulation loop is turned off;
enable the electric compressor to operate, such that a refrigerant flows through the refrigerant cavity to cool the fluid working medium in the cooling liquid cavity; and
control the first power unit to operate, such that the fluid working medium in the battery cooling sub-loop circularly flows;
when the thermal management request comprises a battery heating request, and/or when the battery temperature data is lower than a second threshold:
control the turn-on control unit, such that the battery heating circulation loop is turned on, and the battery cooling sub-loop is turned off;
enable the heater to heat the fluid working medium in the battery heating circulation loop; and
control the second power unit to operate, such that the fluid working medium in the battery heating circulation loop circularly flows;
when the thermal management request comprises a cab cooling request:
control the turn-on control unit, such that the cab cooling circulation loop is turned on; and
enable the electric compressor to operate, such that the refrigerant flows through the refrigeration evaporator; and
when the thermal management request comprises a cab heating request:
control the turn-on control unit, such that the cab heating circulation loop is turned on;
control the second power unit to operate, such that the fluid working medium in the cab heating circulation loop circularly flows; and
enable the heater to heat the fluid working medium in the cab heating circulation loop.

4. The thermal management system for an electric forklift according to claim 2, wherein the fluid temperature data comprises the fluid temperatures at the inlet end and the outlet end of the battery temperature regulator;
when the parameter information comprises the fluid temperature data, on the aspect of controlling at least one of the electric compressor, the heater, the first power unit, the second power unit and the turn-on control unit to operate according to the parameter information, the thermal management control module is configured to:

when the thermal management request comprises a battery cooling request, and/or when the battery temperature data is higher than a first threshold:

if the fluid temperature at the inlet end is less than or equal to a first target value, turn on the battery cooling sub-loop, turn off the battery heating circulation loop, enable the first power unit to operate at a second power rotation speed, and enter a second cooling control phase; and if the fluid temperature at the inlet end is greater than the first target value, enter a first cooling control phase;

wherein, in the first cooling control phase:

control the turn-on control unit, such that the battery cooling sub-loop and the refrigerant sub-loop are both turned on, and the battery heating circulation loop is turned off;

determine whether a difference between the fluid temperature at the outlet end and the first target value is greater than or equal to a first preset value;

if yes, determine that the first power unit and the electric compressor respectively operate at a first power rotation speed and a first compression rotation speed; and if not, determine that the first power unit operates at the second power rotation speed, and the electric compressor operates at a second compression rotation speed;

after the fluid temperature at the inlet end is less than or equal to the first target value, stop the operation of the electric compressor in the refrigerant sub-loop, and enter the second cooling control phase:

in the second cooling control phase, each time when the fluid temperature at the inlet end is greater than the first target value and a difference therebetween is greater than or equal to a second preset value, perform an electric compressor control operation;

the electric compressor control operation comprises:

start the operation of the electric compressor in the refrigerant sub-loop, and determine that the electric compressor operates at the second compression rotation speed; and after the fluid temperature at the inlet end is less than or equal to the first target value, stop the operation of the electric compressor in the refrigerant sub-loop;

the first power rotation speed being greater than the second power rotation speed; the first compression rotation speed being greater than the second compression rotation speed; and the first preset value being greater than the second preset value;

when the thermal management request comprises a battery heating request, and/or when the battery temperature data is lower than a second threshold, enter a first heating control phase, such that the fluid temperature at the inlet end is greater than or equal to the second target value; and after the fluid temperature at the inlet end is greater than or equal to the second target value, stop the operation of the heater in the battery heating circulation loop, and enter a second heating control phase;

wherein, in the first heating control phase:

if the fluid temperature at the inlet end is less than the second target value, perform a battery heating operation;

control the turn-on control unit, such that the battery heating circulation loop is turned on, and the battery cooling sub-loop is turned off;

determine whether a difference between the fluid temperature at the outlet end and the second target value is greater than a third preset value;

if yes, enable the second power unit to operate at a third power rotation speed, and enable the heater to operate at first heating power;

if not, enable the second power unit to operate at a fourth power rotation speed, and enable the heater to operate at second heating power; and in the second heating control phase: each time when the fluid temperature at the inlet end is greater than the second target value and a difference therebetween is greater than or equal to a fourth preset value, perform a heater control operation;

the heater control operation comprises:

restore the operation of the heater in the battery heating circulation loop, and enable the heater to operate at the second heating power; and after the fluid temperature at the inlet end is greater than or equal to the second target value, stop the operation of the heater in the battery heating circulation loop;

the first heating power being greater than the second heating power; the third power rotation speed being greater than the fourth power rotation speed; the third preset value being greater than the fourth preset value; and the first threshold being greater than the second threshold.

5. The thermal management system for an electric forklift according to claim 1, wherein the thermal management system further comprises:

a pressure measurement unit configured to separately measure pressures of an inlet end pipeline and an outlet end pipeline of the electric compressor to obtain an inlet pressure value and an outlet pressure value; and a condensation fan configured to blow air to the condenser;

wherein, the parameter information further comprises the inlet pressure value and the outlet pressure value; and on the aspect of controlling at least one of the electric compressor, the heater, the first power unit, the second power unit and the turn-on control unit to operate according to the parameter information, the thermal management control module is specifically configured to:

when the outlet pressure value is greater than a first pressure value, control the electric compressor to operate at a second compression rotation speed, and control the condensation fan to operate at a first fan rotation speed;

when the outlet pressure value is less than a second pressure value, control the condensation fan to operate at a second fan rotation speed; and when the inlet pressure value is less than a third pressure value, control the electric compressor to operate at a third compression rotation speed, and control the condensation fan to operate at the second fan rotation speed;

the first pressure value being greater than the second pressure value; the second pressure value being greater than the third pressure value; the first fan rotation speed being greater than the second fan rotation speed; and the second compression rotation speed being greater than the third compression rotation speed.

6. The thermal management system for an electric forklift according to claim 2, wherein the thermal management system further comprises:
- an air blower configured to blow air to the refrigeration evaporator and/or the warm air heat exchanger; and
- when the parameter information comprises the indoor temperature data, on the aspect of controlling at least one of the electric compressor, the heater, the first power unit, the second power unit and the turn-on control unit to operate according to the parameter information, the thermal management control module is specifically configured to:
- when the thermal management request comprises a cab cooling request, enter a third cooling control phase, such that the indoor temperature data is less than or equal to a target temperature value;
- after the indoor temperature data is less than or equal to the target temperature value, stop the operation of the air blower, stop the operation of the electric compressor in the cab cooling circulation loop, and enter a fourth cooling control phase;
- in the third cooling control phase, perform a cab cooling operation:
- control the turn-on control unit, such that the cab cooling circulation loop is turned on; and
- determine whether a difference between the indoor temperature data and the target temperature value is greater than or equal to a fifth preset value, the target temperature value being from the thermal management request;
- if yes, determine that the electric compressor operates at a first compression rotation speed and the air blower operates at a first air-blowing rotation speed; and
- if not, determine that the electric compressor operates at a second compression rotation speed and the air blower operates at a second air-blowing rotation speed;
- in the fourth cooling control phase: each time when the indoor temperature data is greater than the target temperature value and the difference therebetween is greater than or equal to a sixth preset value, perform a first running control operation;
- the first running control operation comprising:
- restore the operation of the electric compressor in the cab cooling circulation loop, enable the electric compressor to operate at the second compression rotation speed, and enable the air blower to operate at the second air-blowing rotation speed;
- after the indoor temperature data is less than or equal to the target temperature value, stop the operation of the air blower, stop the operation of the electric compressor in the cab cooling circulation loop;
- the first compression rotation speed being greater than the second compression rotation speed; the first air-blowing rotation speed being greater than the second air-blowing rotation speed; the fifth preset value being greater than the sixth preset value;
- when the thermal management request comprises a cab heating request, enter a third heating control phase, such that the indoor temperature data is greater than or equal to the target temperature value;
- after the indoor temperature data is greater than or equal to the target temperature value, stop the operation of the air blower, stop the operation of the heater and the second power unit in the cab heating circulation loop, and enter a fourth heating control phase;
- in the third heating control phase, perform a cab heating operation:
- control the turn-on control unit, such that the cab heating circulation loop is turned on;
- determine whether the difference between the indoor temperature data and the target temperature value is greater than or equal to a seventh preset value;
- if yes, enable the heater to operate at first heating power, the second power unit to operate at a third power rotation speed, and enable the air blower to operate at the first air-blowing rotation speed;
- if not, enable the heater to operate at second heating power, enable the second power unit to operate at a fourth power rotation speed, and enable the air blower to operate at the second air-blowing rotation speed;
- in the fourth heating control phase: each time when the indoor temperature data is less than the target temperature value and the difference therebetween is greater than or equal to an eighth preset value, perform a second running control operation;
- the second running control operation comprising:
- restore the operation of the heater and the second power unit in the cab heating circulation loop, enable the heater to operate at the second heating power, enable the second power unit to operate at the fourth power rotation speed, and enable the air blower to operate at the second air-blowing rotation speed; and
- after the indoor temperature data is greater than or equal to the target temperature value, stop the operation of the air blower, and stop the operation of the heater in the cab heating circulation loop;
- the first heating power being greater than the second heating power; the third power rotation speed being greater than the fourth power rotation speed; and the seventh preset value being greater than the eighth preset value.

7. The thermal management system for an electric forklift according to claim 2, wherein when the parameter information comprises the fluid temperature data and the indoor temperature data, on the aspect of controlling at least one of the electric compressor, the heater, the first power unit, the second power unit and the turn-on control unit to operate according to the parameter information, the thermal management control module is configured to:
- when the battery cooling sub-loop, the cab cooling circulation loop and the refrigerant sub-loop are all turned on:
- determine a first reference compression rotation speed of the electric compressor according to the fluid temperature data;
- determine a second reference compression rotation speed of the electric compressor according to the indoor temperature data; and
- control the electric compressor to operate according to a greater one of the first reference compression rotation speed and the second reference compression rotation speed; and
- when the battery heating circulation loop and the cab heating circulation loop are both turned on:
- determine first reference heating power of the heater and a first reference power rotation speed of the second power unit according to the fluid temperature data;
- determine second reference heating power of the heater and a second reference power rotation speed of the second power unit according to the indoor temperature data;

control the heater to operate according to a greater one of the first reference heating power and the second reference heating power; and control the second power unit to operate according to a greater one of the first reference power rotation speed and the second reference power rotation speed.

8. The thermal management system for an electric forklift according to claim 1, wherein the turn-on control unit comprises:

a two-position three-way valve configured to perform turn-on switching between the battery cooling sub-loop and the battery heating circulation loop;

a first electronic valve configured to control turn-on and turn-off of the refrigerant sub-loop;

a second electronic valve configured to control turn-on and turn-off of the cab cooling circulation loop;

a third electronic valve configured to control turn-on and turn-off of the battery heating circulation loop; and a fourth electronic valve configured to control turn-on and turn-off of the cab heating circulation loop.

9. A thermal management system for an electric forklift, wherein the thermal management system comprises:

a battery cooling circulation loop, comprising a battery cooling sub-loop and a refrigerant sub-loop, wherein the battery cooling sub-loop comprises a battery temperature regulator and a first power unit connected through a pipeline, and a cooling liquid cavity of a heat exchanger; and the refrigerant sub-loop comprises an electric compressor, a condenser and a first expansion valve connected through a pipeline, and a refrigerant cavity of the heat exchanger;

a battery heating circulation loop comprising a heater, a second power unit and the battery temperature regulator connected through a pipeline;

a cab cooling circulation loop, comprising a refrigeration evaporator and a second expansion valve connected through a pipeline, and the electric compressor and a condenser, wherein the refrigeration evaporator is disposed in a cab of an electric forklift;

a cab heating circulation loop comprising a warm air heat exchanger, the heater and the second power unit connected through a pipeline, wherein the warm air heat exchanger is disposed in the cab;

a two-position three-way valve provided at a junction between the battery cooling sub-loop and the battery heating circulation loop, and configured to perform turn-on switching between the battery cooling sub-loop and the battery heating circulation loop;

a first electronic valve provided in the refrigerant sub-loop, and configured to control turn-on and turn-off of the refrigerant sub-loop;

a second electronic valve provided in the cab cooling circulation loop, and configured to control turn-on and turn-off of the cab cooling circulation loop;

a third electronic valve provided in the battery heating circulation loop, and configured to control turn-on and turn-off of the battery heating circulation loop; and a fourth electronic valve provided in the cab heating circulation loop, and configured to control turn-on and turn-off of the cab heating circulation loop, wherein the first power unit is configured to provide power to a fluid working medium in the battery cooling sub-loop; and the second power unit is configured to provide power to a fluid working medium in the battery heating circulation loop and/or the cab heating circulation loop.

* * * * *